U S009033259B2

(12) United States Patent
Venkatesan et al.

(10) Patent No.: US 9,033,259 B2
(45) Date of Patent: May 19, 2015

(54) METHOD AND SYSTEM FOR MIXING REACTOR FEED

(75) Inventors: Krishnakumar Venkatesan, Clifton Park, NY (US); Ertan Yilmaz, Glenville, NY (US); Ali Ergut, Houston, TX (US)

(73) Assignee: General Electric Company, Schenectady, NY (US)

( * ) Notice: Subject to any disclaimer, the term of this patent is extended or adjusted under 35 U.S.C. 154(b) by 1015 days.

(21) Appl. No.: 12/977,515

(22) Filed: Dec. 23, 2010

(65) Prior Publication Data
US 2012/0160140 A1 Jun. 28, 2012

(51) Int. Cl.
*B05B 7/06* (2006.01)
*F23D 1/00* (2006.01)
*B05B 7/04* (2006.01)
*B05B 7/08* (2006.01)
*C10J 3/50* (2006.01)

(52) U.S. Cl.
CPC .............. *F23D 1/005* (2013.01); *B05B 7/0408* (2013.01); *B05B 7/061* (2013.01); *B05B 7/08* (2013.01); *B05B 7/0815* (2013.01); *C10J 3/50* (2013.01); *Y02E 20/18* (2013.01); *C10J 2300/0959* (2013.01); *C10J 2300/0976* (2013.01); *C10J 2300/1653* (2013.01); *C10J 2300/1678* (2013.01); *F23D 1/00* (2013.01); *F23D 2201/10* (2013.01); *F23D 2201/30* (2013.01); *F23D 2214/00* (2013.01)

(58) Field of Classification Search
USPC .............. 239/440, 441, 416.4, 399, 403, 418, 239/419, 419.5, 421, 424, 428, 428.5, 433, 239/434.5; 123/299, 467
See application file for complete search history.

(56) References Cited

U.S. PATENT DOCUMENTS

| 3,468,487 | A | * | 9/1969 | Warren | 239/403 |
| 5,803,725 | A | * | 9/1998 | Horn et al. | 431/187 |
| 6,289,677 | B1 | * | 9/2001 | Prociw et al. | 60/748 |

(Continued)

FOREIGN PATENT DOCUMENTS

| CN | 1119723 A | 4/1996 |
| CN | 1247290 A | 3/2000 |

(Continued)

OTHER PUBLICATIONS

Unofficial English translation of CN Office Action issued May 12, 2014 in connection with corresponding CN Patent Application No. 201110452753.2.

*Primary Examiner* — Melanie Tyson
*Assistant Examiner* — Viet Le
(74) *Attorney, Agent, or Firm* — Armstrong Teasdale LLP

(57) ABSTRACT

A method and system of feeding fuel into a gasifier are provided. The feed injector system includes a first injector port assembly including a plurality of annular channels substantially concentric about a longitudinal axis that define corresponding fluid flow paths that direct a flow of fluid substantially axially therethrough from a respective source to a reaction zone and a second injector port assembly including a flow port surrounded by a plurality of auxiliary ports spaced about a circumference of the flow port, the plurality of auxiliary ports communicatively coupled to a toroidal passage configured to receive a flow of fluid and channel the flow of fluid to the auxiliary ports such that the flow of fluid is discharged from the auxiliary ports having an axial flow component, a radially inward flow component, and a circumferential flow component.

15 Claims, 4 Drawing Sheets

(56) References Cited

U.S. PATENT DOCUMENTS

| | | |
|---|---|---|
| 2009/0077889 A1 | 3/2009 | Duca et al. |
| 2009/0077891 A1 | 3/2009 | Duca et al. |
| 2010/0115842 A1 | 5/2010 | Raterman |
| 2010/0146856 A1 | 6/2010 | Zamansky et al. |
| 2010/0146857 A1 | 6/2010 | Zamansky et al. |
| 2010/0146858 A1 | 6/2010 | Zamansky et al. |

FOREIGN PATENT DOCUMENTS

| | | |
|---|---|---|
| CN | 101098750 A | 1/2008 |
| CN | 101760245 A | 6/2010 |
| EP | 2199375 A2 | 6/2010 |
| WO | 2009042743 A1 | 4/2009 |
| WO | 2009042744 A1 | 4/2009 |
| WO | 2009134530 A2 | 11/2009 |
| WO | 2010056334 A2 | 5/2010 |

* cited by examiner

METHOD AND SYSTEM FOR MIXING REACTOR FEED

BACKGROUND OF THE INVENTION

The field of the invention relates generally to gasification systems, and more specifically to a method and system for mixing and injecting feed into a gasifier.

At least some known gasifiers convert a mixture of fuel, air or oxygen, liquid water and/or steam, and/or slag into an output of partially oxidized gas, sometimes referred to as "syngas." In an integrated gasification combined-cycle (IGCC) power generation system, the syngas is supplied to the combustor of a gas turbine engine, which powers a generator that supplies electrical power to a power grid. Exhaust from the gas turbine engines may be supplied to a heat recovery steam generator that generates steam for driving a steam turbine. Power generated by the steam turbine also drives an electrical generator that provides electrical power to the power grid.

The fuel, air or oxygen, liquid water and/or steam, and/or slag additive are injected into the gasifier from separate sources through a feed injector that couples the feed sources to a feed nozzle. The feed sources traverse the feed injector separately and are joined together in a reaction zone downstream of the nozzle. For the reaction to complete in the short time the feed is in residence in the reaction zone, intimate mixing of the feed components needs to occur. At least some know gasification feed injectors include spraying the feed components at high velocity to encourage atomization, however such methods reduce the reaction time available and tend to inhibit a complete reaction.

Some known dry feed injector designs include multiple ports for solid fuel injection in combination with oxidizer ports. The injector tip is similar to that of a showerhead and the solid+gas fuel mixture is split into small quantities along various flow paths inside the injector. Because of the distribution of the solid into multiple streams, the mixing time for the smaller quantity of fuel is very short. Hence, these injectors provide an almost uniform distribution within short distances from the injector tip. However, questions and concerns remain regarding the distribution of the solid fuel across the multitude of ports.

BRIEF DESCRIPTION OF THE INVENTION

In one embodiment, a feed injector system includes a first injector port assembly including a plurality of annular channels substantially concentric about a longitudinal axis that define corresponding fluid flow paths that direct a flow of fluid substantially axially therethrough from a respective source to a reaction zone and a second injector port assembly including a flow port surrounded by a plurality of auxiliary ports spaced about a circumference of the flow port, the plurality of auxiliary ports communicatively coupled to a toroidal passage configured to receive a flow of fluid and channel the flow of fluid to the auxiliary ports such that the flow of fluid is discharged from the auxiliary ports having an axial flow component, a radially inward flow component, and a circumferential flow component.

In another embodiment, a method of feeding fuel into a gasifier includes channeling individual streams of at least one of fuel and oxidizer through respective ones of a plurality of co-axial injector passages, respective outlets of the plurality of injector passages centrally positioned in a tip of an injector nozzle, channeling a stream of fuel through a plurality of injector passages, having an outlet positioned radially outward and circumferentially spaced about the respective outlets, and channeling a stream of oxidizer through a plurality of auxiliary injector passages each positioned radially outward and circumferentially spaced about respective ones of the plurality of injector passages.

In yet another embodiment, a gasification system includes a pressure vessel for partially oxidizing a fuel and a feed injector configured to inject a fuel into the pressure vessel. The feed injector further includes a first injector port assembly including a plurality of annular channels substantially concentric about a longitudinal axis that define corresponding fluid flow paths that direct a flow of fluid substantially axially therethrough from a respective source to a reaction zone and a second injector port assembly including a flow port surrounded by a plurality of auxiliary ports spaced about a circumference of the flow port, the plurality of auxiliary ports communicatively coupled to a toroidal passage configured to receive a flow of fluid and channel the flow of fluid to the auxiliary ports such that the flow of fluid is discharged from the auxiliary ports having an axial flow component, a radially inward flow component, and a circumferential flow component.

BRIEF DESCRIPTION OF THE DRAWINGS

FIG. 1 is a schematic diagram of an integrated gasification combined-cycle (IGCC) power generation system in accordance with an exemplary embodiment of the present invention;

FIG. 2 is a schematic view of an exemplary injection nozzle that may be used with a pressure vessel, such as, the gasifier shown in FIG. 1;

FIG. 3 is an axial view of a face of a multi-port co-axial impinging injector tip that may be used with the gasifier shown in FIG. 1; and FIG. 4 is a side elevation view of a feed injector system that may be used with the gasifier shown in FIG. 1.

DETAILED DESCRIPTION OF THE INVENTION

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, systems and methods injecting feed into a reactor. However, it is contemplated that this disclosure has general application to piping systems in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present invention describe a gasifier feed injector that facilitates optimal mixing of solid, liquid, and gaseous fuels with oxidizer within a gasifier. The injector has multiple flow paths via which various fluids are transported and injected into the gasifier. The efficiency of the gasifier is at its highest when the fuel and oxidizer are mixed optimally. The injector flow paths have a high mixing efficiency for the flow exiting the tip of the injector. The injector and its internal flow paths include but are not limited to the location of the various fuel and oxidizer streams, exit angles of the various fuel and oxidizer streams, and exit dimensions of the various fluid streams.

Figure 1:
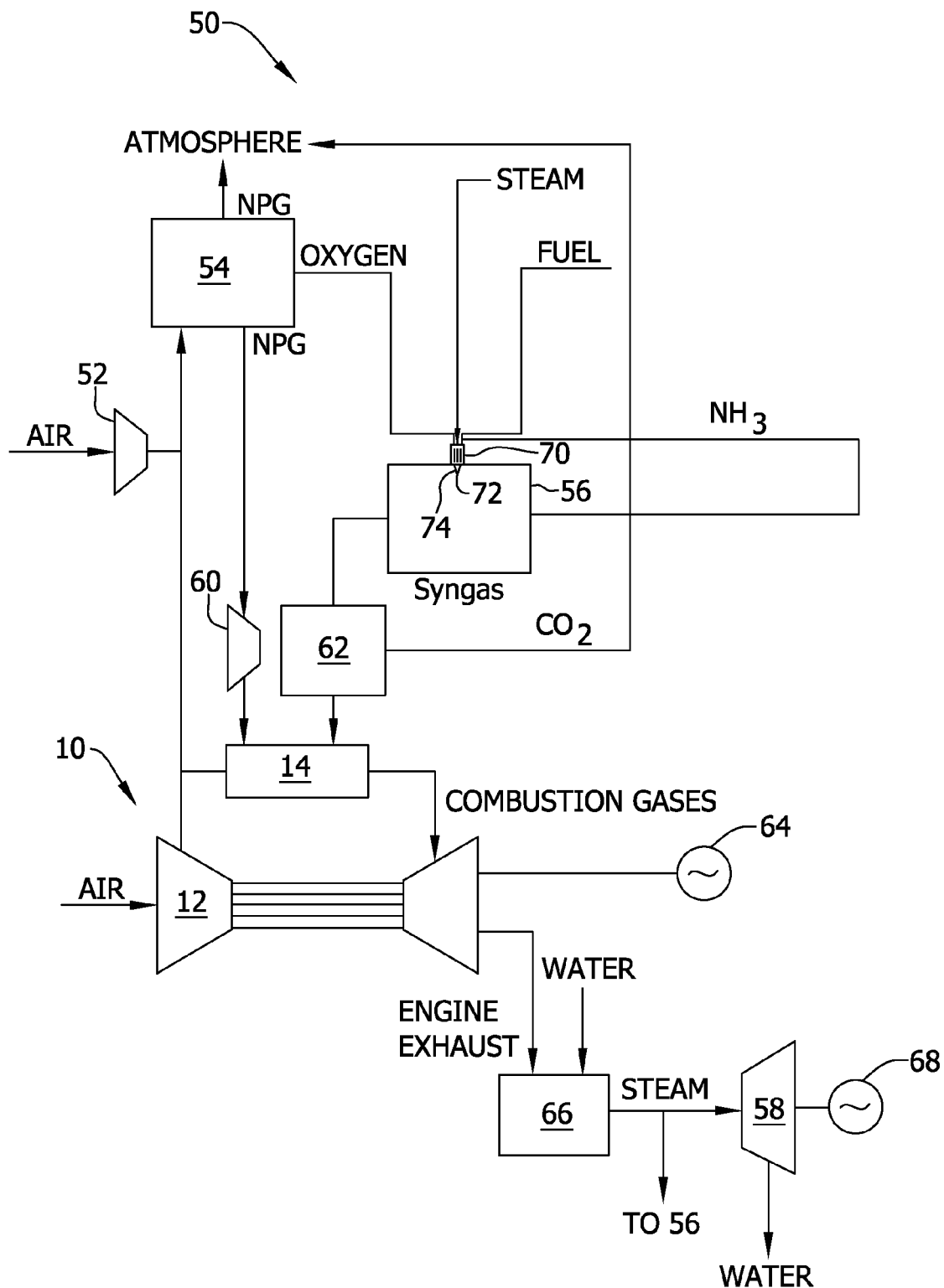
FIGS. 1-4 show exemplary embodiments of the method and system described herein.

FIG. 1 is a schematic diagram of an integrated gasification combined-cycle (IGCC) power generation system 50 in accordance with an exemplary embodiment of the present invention. In the exemplary embodiment, IGCC system 50 includes a main air compressor 52, an air separation unit 54 coupled in flow communication to compressor 52, a gasifier 56 coupled in flow communication to air separation unit 54, a gas turbine engine 10 coupled in flow communication to gasifier 56, and a steam turbine 58. In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas". The process gas generated by air separation unit 54 includes nitrogen and will be referred to herein as "nitrogen process gas". The nitrogen process gas may also include other gases such as, but not limited to, oxygen and/or argon. For example, in some embodiments, the nitrogen process gas includes between about 95% and about 100% nitrogen. The oxygen flow is channeled to gasifier 56 for use in generating partially combusted gases, referred to herein as "syngas" for use by gas turbine engine 10 as fuel, as described below in more detail. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 56 may be cleaned in a clean-up device 62 before being channeled to gas turbine engine combustor 14 for combustion thereof. Carbon dioxide may be separated from the syngas during clean-up and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 56 for generating the syngas. In other known IGCC systems 50, thermal energy produced from the generation of syngas is used to generate additional steam for driving steam turbine 58.

In the exemplary embodiment, gasifier 56 includes an injection nozzle 70 extending through gasifier 56. Injection nozzle 70 includes a nozzle tip 72 at a distal end 74 of injection nozzle 70. Injection nozzle 70 further includes a port (not shown in FIG. 1) that is configured to direct a stream of fluid proximate nozzle tip 72 such that the stream of fluid facilitates reducing a temperature of at least a portion of nozzle tip 72. In the exemplary embodiment, injection nozzle 70 is configured to direct a stream of ammonia proximate nozzle tip 72 such that the stream of ammonia facilitates reducing a temperature of at least a portion of nozzle tip 72.

Figure 2:
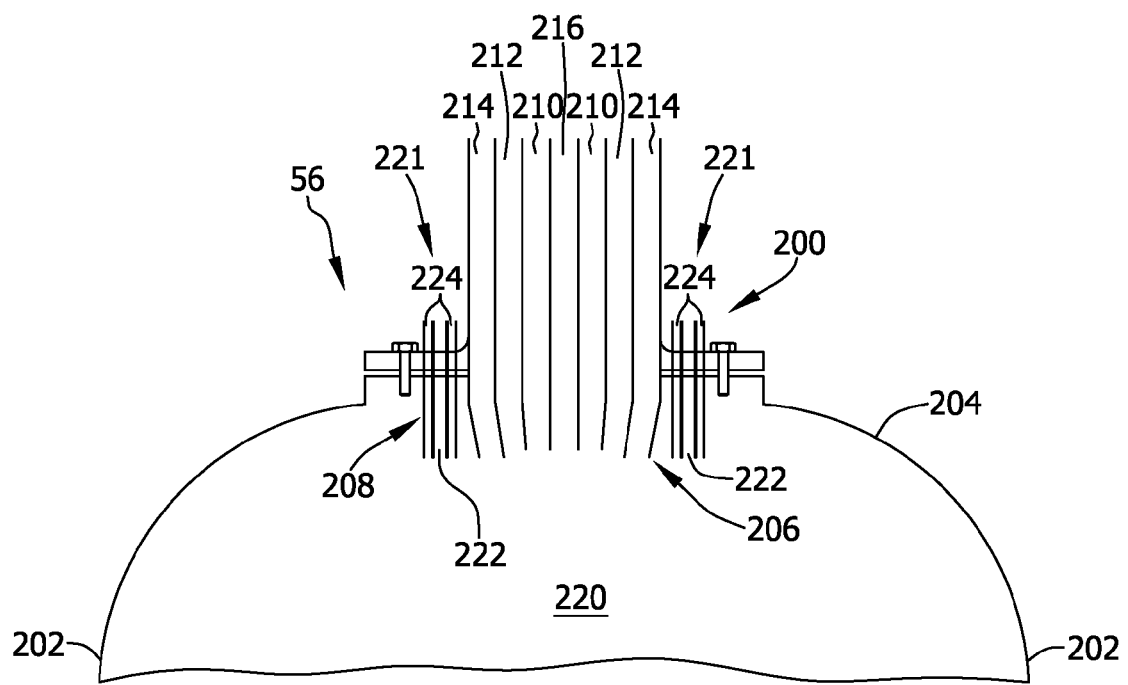

FIG. 2 is a schematic view of an exemplary injection nozzle 200 that may be used with a pressure vessel, such as, gasifier 56 (shown in FIG. 1). Injection nozzle 200 extends through a sidewall 202 or head 204 of gasifier 56. Injection nozzle 200 includes a nozzle tip 206 at a distal end 208 of injection nozzle 200 and further includes a plurality of co-axial annular passages 210, 212, and 214 extending from outside gasifier 56 to nozzle tip 206. In various embodiments, injection nozzle 200 includes a central passageway 216, alternatively central passageway 216 is blocked, not used, or non-existent. Each of passageways 210, 212, 214, and 216 is configured to transport at least one of a carbonaceous feedstock, air, oxygen, steam, and byproducts of a process into gasifier 56. Each of passageways 210, 212, 214, and 216 is sized and oriented to predetermined parameters to facilitate optimizing mixing of the at least one of a carbonaceous feedstock, air, oxygen, steam, and byproducts.

In the exemplary embodiment, passageway 216 is configured to transport at least one of fuel, air, oxygen, process byproducts, and steam into gasifier 56. Passageway 210 is positioned radially outward from passageway 216 and is configured to transport at least one of fuel, air, oxygen, process byproducts, and steam into gasifier 56. Passageway 212 is positioned radially outward from passageway 210 and is configured to transport at least one of fuel, air, oxygen, process byproducts, and steam into gasifier 56. Passageway 214 is positioned radially outward from passageway 212 and is also configured to transport fuel, air, oxygen, process byproducts, and steam into gasifier 56. In various other embodiments, the particular passageway transporting the various fluids may vary and the fluid composition may vary from the composition described in the exemplary embodiment. For example, passageway 214 may be configured to transport a fluid other than byproducts into gasifier 56.

In operation, a flow of air, oxygen, and/or steam flowing through and exiting passageway 216 tends to atomize and aerate a slurry of carbonaceous feedstock flowing through and exiting passageway 210. Due to heat energy in a reaction zone 220, components of the carbonaceous feedstock at least partially combust, generating additional heat in reaction zone 220. A flow of air, oxygen, and/or steam flowing through and exiting passageway 212 tends to further atomize and aerate the slurry of carbonaceous feedstock flowing through and exiting passageway 210. A plurality of secondary flow assemblies 221 are spaced circumferentially about injection nozzle 200 and each secondary flow assembly 221 includes a plurality of flow ports 222 surrounded by a plurality of auxiliary ports 224.

Figure 3:
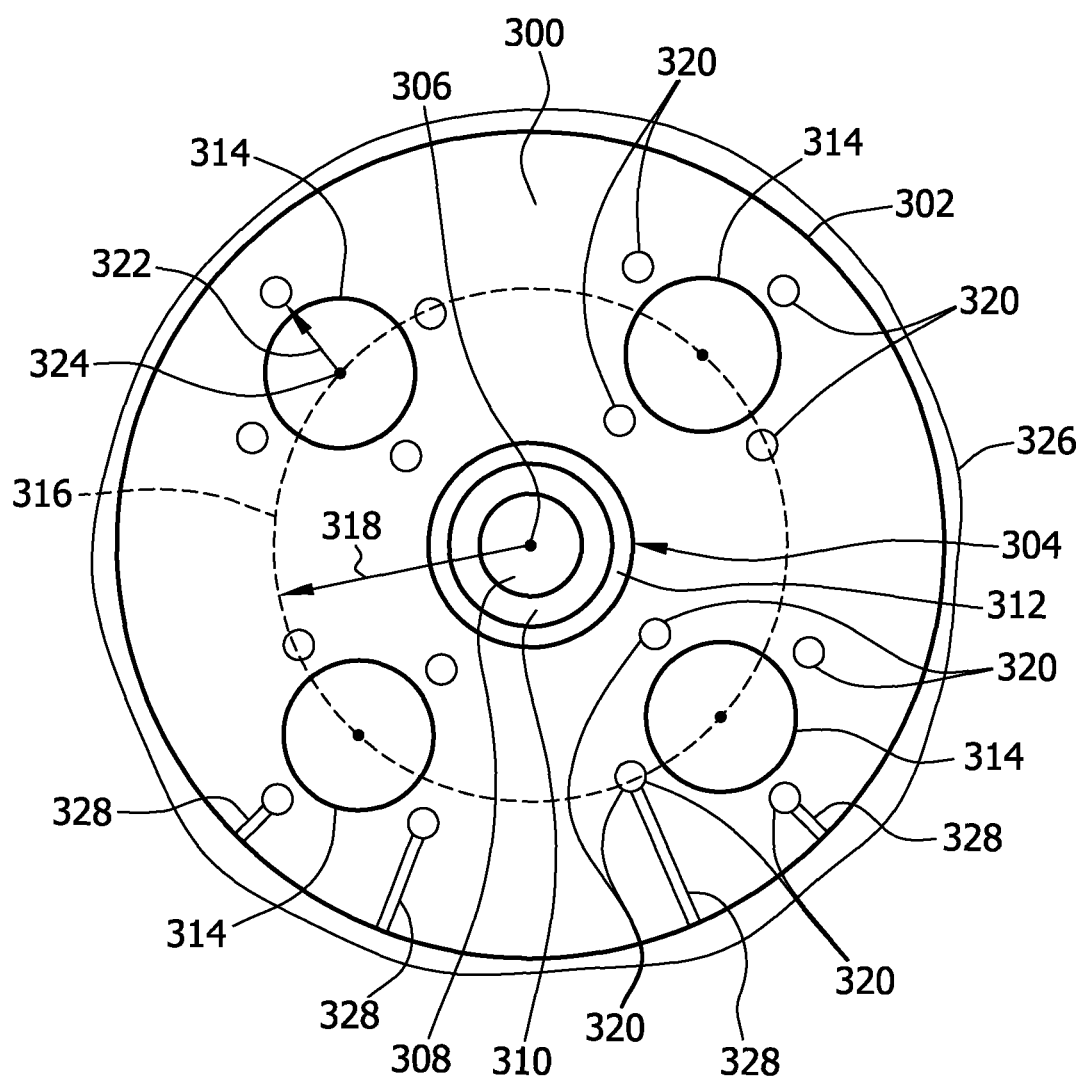

FIG. 3 is an axial view of a face 300 of a multi-port co-axial impinging injector tip 302 that may be used with gasifier 56 (shown in FIG. 1). In the exemplary embodiment, tip 302 may be used when using at least partial dry fuel feed to gasifier 56. Injector tip 302 includes a central multi-flow port 304 that is positioned coaxially with a longitudinal axis 306 of injector tip 302. In the exemplary embodiment, port 304 includes a first central flow passage 308, a second annular flow passage 310 that substantially circumscribes first flow passage 308, and a third annular flow passage 312 that substantially circumscribes second flow passage 310.

Injector tip 302 also includes a plurality of circumferentially-spaced flow ports 314. In the exemplary embodiment, flow ports 314 are equally circumferentially-spaced along a substantially circular path 316 having a predetermined radius 318 from axis 306. In various embodiments, flow ports 314 are variably-spaced along path 316, spaced at different radial lengths from axis 306, or a combination of thereof. In the exemplary embodiment, each flow port 314 is surrounded by a plurality of auxiliary ports 320, which may be equally circumferentially-spaced about a respective flow port 314 or may be unequally-spaced about flow port 314. Moreover, each of auxiliary ports 320 may be at an equal radial distance 322 from a longitudinal axis 324 of a respective flow port or may be positioned at different radial distances 322 from longitudinal axis 324. In the exemplary embodiment, auxiliary ports 320 are coupled in flow communication with a plenum 326 that may be positioned radially outwardly from tip face 300. Auxiliary ports 320 are coupled to plenum 326 using passages 328 formed in tip 302. Passages 328 may be formed as radially inwardly directed passages from plenum 326 to auxiliary ports 320 or may be formed as part of a toroidal feed path configured to impact a circumferential flow component to fluid passing through passages 328 and/or auxiliary ports 320.

Injector tip 302 includes multiple flow paths for each solid, liquid and/or gaseous fuel and an oxidizer. During operation, central port 304, flow ports 314 and auxiliary ports 320 are used to inject solid fuel and conveyance gas into gasifier 56. A fraction of fluids distributed between central port 304 and flow port 314 can be controlled by varying the flow rates via the respective flow paths. The triple annular central port 304 may be used for injecting any combination of solids, liquid and gases as fuels and oxidizer. In one embodiment, passages 308 and 312 channel an oxidizer and passage 310 channels the solid and gas mixture. In another embodiment, passage 310 channels the liquid fuel. In still another embodiment, passage 308 channels the solid and gas mixture and passage 312 channels the liquid while passage 310 channels the oxidizer. In yet another embodiment, passage 308 channels the solid and gas mixture and passage 310 channels the liquid fuel. Flow ports 314 can be used to inject any combination of solid and or liquid fuel. Auxiliary ports 320 can be used for injecting the oxidizer.

An internal flow path of auxiliary ports 320 is made toroidal to distribute a momentum of the flow in all three directional axes to improve mixing. The toroidal arrangement provides the effect of swirl for an impinging flow.

Figure 4:
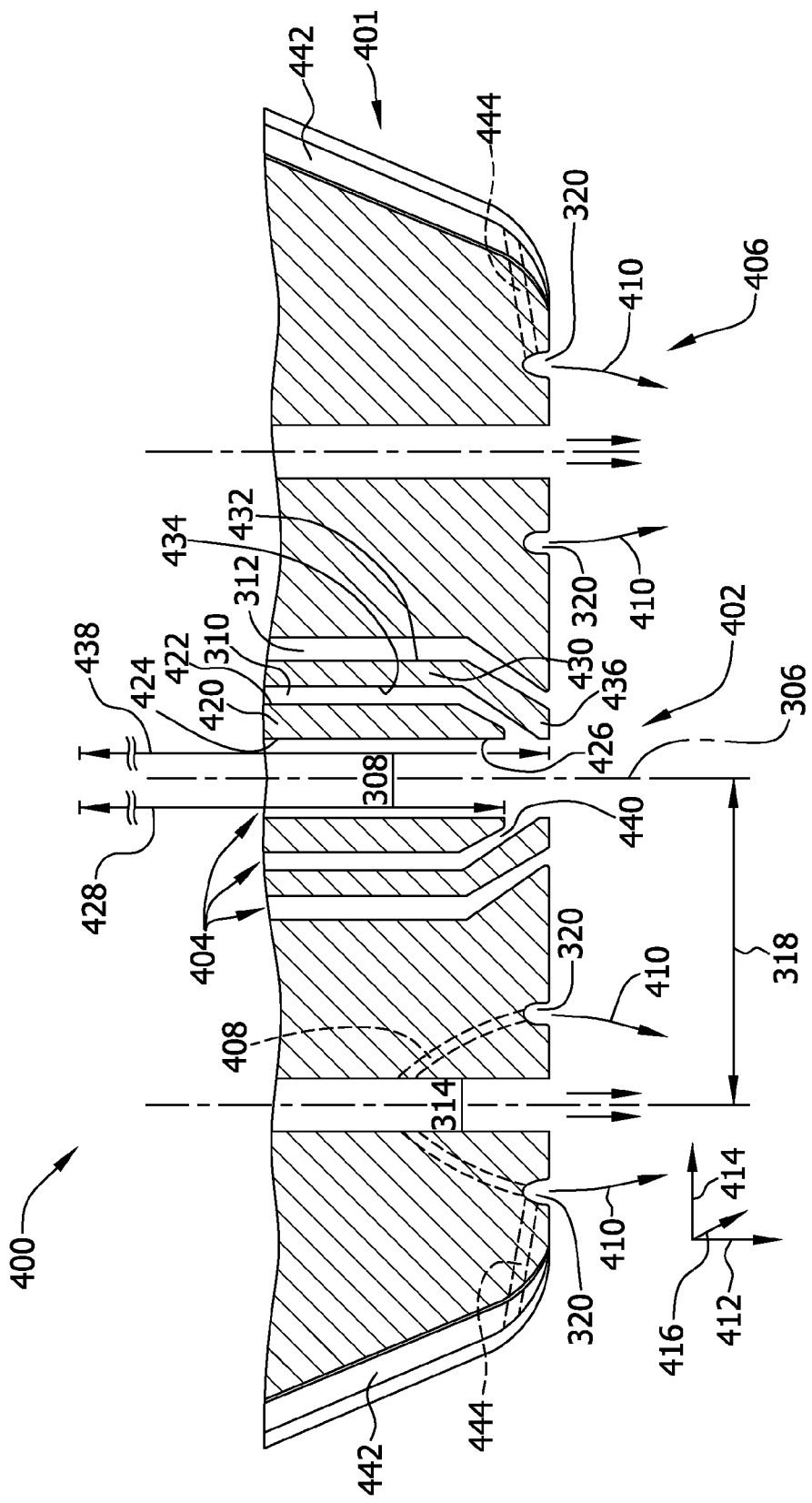

FIG. 4 is a side elevation view of a feed injector system 400 that may be used with gasifier 56 (shown in FIG. 1). In the exemplary embodiment, feed injector system 400 includes an injector tip assembly 401 that includes a first injector port assembly 402 including a plurality of annular channels 404 substantially concentric about longitudinal axis 306 that define corresponding fluid flow passages 308, 310, and 312 that direct a flow of fluid substantially axially therethrough from a respective source (not shown in FIG. 4) to reaction zone 220. Annular channels 404 are substantially concentric and include a first substantially cylindrically shaped conduit 420 coaxial with longitudinal axis 306 and having a radially outer surface 422 and a radially inner surface 424. First conduit 420 further includes a supply end (not shown for clarity), a discharge end 426 and a length 428 extending therebetween. First injector port assembly 402 also includes a second conduit 430 at least partially within and substantially concentrically aligned with first conduit 420. Second conduit 430 is substantially cylindrically shaped about longitudinal axis 306 and has a radially outer surface 432 and a radially inner surface 434. Second conduit 430 further includes a supply end (not shown for clarity), a discharge end 436, and a length 438 extending therebetween. In one embodiment, first conduit 420 includes a chamfered discharge end 426. Second conduit 430 comprises a radially converging discharge end 436. A flow path 440 is defined between the first and the second conduits and is directed radially inwardly between radially converging discharge end 436 and the chamfered discharge end 426. Flow path 440 is configured to channel a dry solid fuel and conveyance fluid therethrough.

Feed injector system 400 further includes a second injector port assembly 406 including flow port 314 surrounded by auxiliary ports 320 spaced about a circumference of flow port 314. Auxiliary ports 320 are communicatively coupled to a toroidal passage 408 configured to receive a flow of fluid and channel the flow of fluid to auxiliary ports 320 such that the flow of fluid 410 is discharged from auxiliary ports 320 having an axial flow component 412, a radially inward flow component 414, and a circumferential flow component 416. Toroidal passage 408 is configured to impart the direction of circumferential flow component 416 to flow through toroidal passage 408. Flow port 314 is configured to channel at least one of a dry solid fuel and a liquid fuel and auxiliary ports 320 are configured to channel an oxidizer to reaction zone 220. In various embodiments, feed injector system 400 further includes a plenum 442 circumscribing at least injector tip assembly 401 and coupled in flow communication with at least some of the plurality of auxiliary ports 320. In one embodiment, plenum 442 is coupled in flow communication with auxiliary ports 320 through one or more passages 444 extending from plenum 442 to auxiliary ports 320.

The above-described embodiments of a method and system of feeding fuel into a gasifier injector provides a cost-effective and reliable means for facilitating optimal mixing for a relatively high carbon conversion, which subsequently improves total gasifier efficiency and may facilitate increasing an overall IGCC plant efficiency. More specifically, the methods and systems described herein facilitate controlling various fuel and oxidizer flows to assist in optimizing mixing across a wide range of flow conditions using multiple knobs provided by the injector. In addition, the above-described method and system facilitates providing a broader and more uniform mixing profile owing to injection at multiple locations. As a result, the method and system described herein facilitate mixing and feeding fuel and oxidizer into a gasifier in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A feed injector system comprising an injector tip including:
  a first injector port assembly comprising a plurality of annular channels substantially concentric about a longitudinal axis that define corresponding fluid flow paths that direct a first flow of fluid substantially axially therethrough from a respective source to a reaction zone; and a second injector port assembly comprising a plurality of circumferentially-spaced flow ports, each flow port of said plurality of circumferentially-spaced flow ports extending axially to a face of said injector tip, each said flow port surrounded by a plurality of auxiliary ports spaced about a circumference of a respective circumferentially-spaced flow port of said plurality of circumferentially-spaced flow ports, said plurality of auxiliary ports coupled in flow communication with a toroidal-shaped passage configured to receive a second flow of fluid from said respective circumferentially-spaced flow port and channel the second flow of fluid to said auxiliary ports such that the second flow of fluid is directed by said toroidal-shaped passage in an axial direction, a radially inward direction towards said respective circumferentially-spaced flow port, and a circumferential direction about said respective circumferentially-spaced flow port prior to being discharged from said auxiliary ports, said plurality of auxiliary ports also coupled in flow communication to a plenum through one or more passages extending from said plenum to said auxiliary ports, said plenum at least partially circumscribing said injector tip assembly.

2. A system in accordance with claim 1, wherein said plurality of substantially concentric annular channels comprises:

a first conduit substantially cylindrically shaped about a longitudinal axis, said first conduit comprising a radially outer surface and a radially inner surface, said first conduit further comprising a supply end, a discharge end and a length extending therebetween;

a second conduit at least partially surrounding and substantially concentrically aligned with said first conduit, said second conduit substantially cylindrically shaped about the longitudinal axis, said second conduit comprising a radially outer surface and a radially inner surface, said second conduit further comprising a supply end, a discharge end, and a length extending therebetween.

3. A system in accordance with claim 2, wherein said first conduit comprises a chamfered discharge end.

4. A system in accordance with claim 2, wherein said second conduit comprises a radially converging discharge end.

5. A system in accordance with claim 2, wherein said first conduit comprises a chamfered discharge end and said second conduit comprises a radially converging discharge end such that a flow path defined between said first and said second conduits is directed radially inwardly between the radially converging discharge end and the chamfered discharge end.

6. A system in accordance with claim 5, wherein said flow path defined between said first and said second conduits is configured to channel a dry solid fuel and conveyance fluid.

7. A system in accordance with claim 2, wherein a flow path defined within said first conduit is configured to channel a dry solid fuel and conveyance fluid.

8. A system in accordance with claim 1, wherein said flow port is configured to channel at least one of a dry solid fuel and a liquid fuel and said auxiliary ports are configured to channel an oxidizer to a reaction zone.

9. A system in accordance with claim 1, further comprising a plenum circumscribing said feed injector port.

10. A system in accordance with claim 9, wherein said plenum is coupled in flow communication with said auxiliary ports.

11. A system in accordance with claim 9, wherein said plenum is coupled in flow communication with said auxiliary ports through one or more passages extending from said plenum to said auxiliary ports.

12. A gasification system comprising:

a pressure vessel for partially oxidizing a fuel;

a feed injector configured to inject a fuel into the pressure vessel;

wherein the feed injector further comprises:

a first injector port assembly comprising a plurality of annular channels substantially concentric about a longitudinal axis that define corresponding fluid flow paths that direct a first flow of fluid substantially axially therethrough from a respective source to a reaction zone; and a second injector port assembly comprising a plurality of circumferentially-spaced flow ports, each said flow port surrounded by a plurality of auxiliary ports spaced about a circumference of a respective circumferentially-spaced flow port of the plurality of circumferentially-spaced flow ports, said plurality of auxiliary ports coupled in flow communication with a toroidal-shaped passage configured to receive a second flow of fluid from said respective circumferentially-spaced flow port and channel the second flow of fluid to said auxiliary ports such that the second flow of fluid is directed by said toroidal-shaped passage in an axial direction, a radially inward direction towards said respective circumferentially-spaced flow port, and a circumferential direction about said respective circumferentially-spaced flow port prior to being discharged from said auxiliary ports, said plurality of auxiliary ports also coupled in flow communication to a plenum through one or more passages extending from said plenum to said auxiliary ports, said plenum at least partially circumscribing said injector tip assembly.

13. A system in accordance with claim 12, wherein said toroidal-shaped passage is configured to impart a circumferential flow direction to the second flow of fluid through the toroidal-shaped passage.

14. A system in accordance with claim 12, further comprising a plenum circumscribing said feed injector.

15. A system in accordance with claim 14, wherein said plenum is coupled in flow communication with said auxiliary ports through one or more passages extending from said plenum to said auxiliary ports.

* * * * *